United States Patent
Jiang et al.

(10) Patent No.: US 10,459,464 B2
(45) Date of Patent: Oct. 29, 2019

(54) METHOD AND APPARATUS FOR CONTROLLING DISTRIBUTION OF POWER

(75) Inventors: Zhiqiang Jiang, Shanghai (CN); Wei-Shih Chiang, Shanghai (CN); Yunfeng Chen, Shanghai (CN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 1013 days.

(21) Appl. No.: 14/424,716

(22) PCT Filed: Sep. 3, 2012

(86) PCT No.: PCT/CN2012/080905
§ 371 (c)(1),
(2), (4) Date: Feb. 27, 2015

(87) PCT Pub. No.: WO2014/032302
PCT Pub. Date: Mar. 6, 2014

(65) Prior Publication Data
US 2015/0261231 A1    Sep. 17, 2015

(51) Int. Cl.
*H02J 3/00*    (2006.01)
*G05F 1/12*    (2006.01)
(Continued)

(52) U.S. Cl.
CPC ........... *G05F 1/12* (2013.01); *G06F 1/266* (2013.01); *H02J 3/00* (2013.01); *H01R 25/003* (2013.01); *Y10T 307/406* (2015.04)

(58) Field of Classification Search
CPC ... G05F 1/12; G05F 1/00; H01R 13/00; H02J 7/00; H02J 3/00; H02M 5/00; H01H 47/00
(Continued)

(56) References Cited

U.S. PATENT DOCUMENTS

| 4,114,048 A | 9/1978 | Hull et al. |
| 4,310,866 A | 1/1982 | Wirth |

(Continued)

FOREIGN PATENT DOCUMENTS

| CN | 1459917 A | 12/2003 |
| CN | 2850053 Y | 12/2006 |

(Continued)

OTHER PUBLICATIONS

Notification of Transmittal of the International Search Report and the Written Opinion of the International Searchring Authority from corresponding PCT/CN2012/080905 dated Jun. 6, 2013.

(Continued)

*Primary Examiner* — Rexford N Barnie
*Assistant Examiner* — Joseph N Inge
(74) *Attorney, Agent, or Firm* — Lando & Anastasi, LLP (57) ABSTRACT

A method and apparatus for controlling distribution of power is provided. The apparatus comprises a plurality of power outlets including a master power outlet (12M) and at least one controlled power outlet (12S), a control circuit configured to sense a characteristic of power delivered to the master power outlet (12M), a relay circuit coupled to the control circuit and a power supply configured to provide power to the control circuit and to the relay circuit. The power supply adjusts a voltage level on the base of the power delivered to the master power outlet. The apparatus can reduce energy consumption.

10 Claims, 4 Drawing Sheets

(51) Int. Cl.
*G06F 1/26* (2006.01)
*H01R 25/00* (2006.01)

(58) Field of Classification Search
USPC .......................................................... 307/31
See application file for complete search history.

(56) References Cited

U.S. PATENT DOCUMENTS

| | | | |
|---|---|---|---|
| 4,564,767 A | 1/1986 | Charych | |
| 4,674,031 A | 6/1987 | Siska, Jr. | |
| 4,683,529 A | 7/1987 | Bucher, II | |
| 4,763,013 A | 8/1988 | Gvoth, Jr. et al. | |
| 4,782,241 A | 11/1988 | Baker et al. | |
| 4,816,982 A | 3/1989 | Severinsky | |
| 4,831,508 A | 5/1989 | Hunter | |
| 4,860,185 A | 8/1989 | Brewer et al. | |
| 4,903,186 A | 2/1990 | Pullen, Jr. | |
| 4,943,902 A | 7/1990 | Severinsky | |
| 4,964,029 A | 10/1990 | Severinsky et al. | |
| 4,980,812 A | 12/1990 | Johnson, Jr. et al. | |
| 5,019,717 A | 5/1991 | McCurry et al. | |
| 5,047,913 A | 9/1991 | De Doncker et al. | |
| 5,099,410 A | 3/1992 | Divan | |
| 5,126,585 A | 6/1992 | Boys | |
| 5,172,309 A | 12/1992 | DeDoncker et al. | |
| 5,315,533 A | 5/1994 | Stich et al. | |
| 5,351,179 A | 9/1994 | Tsai et al. | |
| 5,465,011 A | 11/1995 | Miller et al. | |
| 5,541,828 A | 7/1996 | Rozman | |
| 5,559,685 A | 9/1996 | Lauw et al. | |
| 5,563,455 A * | 10/1996 | Cheng | H02J 3/14 307/38 |
| 5,579,197 A | 11/1996 | Mengelt et al. | |
| 5,581,450 A | 12/1996 | Walne | |
| 5,587,685 A | 12/1996 | Johansson | |
| 5,602,462 A | 2/1997 | Stich et al. | |
| 5,615,094 A | 3/1997 | Cosentino et al. | |
| 5,684,686 A | 11/1997 | Reddy | |
| 5,684,688 A | 11/1997 | Rouaud et al. | |
| 5,834,924 A | 11/1998 | Konopka et al. | |
| 5,877,947 A | 3/1999 | Chen et al. | |
| 5,943,224 A | 8/1999 | Mao | |
| 5,982,652 A | 11/1999 | Simonelli et al. | |
| 6,046,920 A | 4/2000 | Cazabat et al. | |
| 6,069,412 A | 5/2000 | Raddi et al. | |
| 6,184,593 B1 | 2/2001 | Jungreis | |
| 6,201,319 B1 | 3/2001 | Simonelli et al. | |
| 6,259,235 B1 | 7/2001 | Fraidlin et al. | |
| 6,353,547 B1 | 3/2002 | Jang et al. | |
| 6,381,156 B1 | 4/2002 | Sakai et al. | |
| 6,400,591 B2 | 6/2002 | Reilly et al. | |
| 6,404,658 B1 | 6/2002 | Reilly | |
| 6,486,430 B2 | 11/2002 | Naor | |
| 6,630,751 B2 | 10/2003 | Curtis et al. | |
| 6,630,752 B2 | 10/2003 | Fleming et al. | |
| 6,728,119 B2 | 4/2004 | Reilly et al. | |
| 6,738,915 B1 | 5/2004 | Mott et al. | |
| 6,757,185 B2 | 6/2004 | Rojas Romero | |
| 6,765,373 B1 | 7/2004 | Harvey et al. | |
| 6,903,537 B2 | 6/2005 | Tzeng et al. | |
| 6,917,506 B2 * | 7/2005 | Chou | G06F 1/266 361/191 |
| 6,944,036 B2 | 9/2005 | Yan et al. | |
| 7,099,134 B2 | 8/2006 | Ying et al. | |
| 7,106,605 B2 | 9/2006 | Chen et al. | |
| 7,126,409 B2 | 10/2006 | Nielsen | |
| 7,352,083 B2 | 4/2008 | Nielsen et al. | |
| 7,432,615 B2 | 10/2008 | Hjort | |
| 7,446,433 B2 | 11/2008 | Masciarelli et al. | |
| 7,944,086 B2 | 5/2011 | Hodges et al. | |
| 7,964,994 B2 | 6/2011 | DuBose et al. | |
| 7,973,425 B2 | 7/2011 | Chen | |
| 7,977,825 B2 | 7/2011 | Gilbert | |
| 8,138,626 B2 | 3/2012 | Jonsson et al. | |
| 8,255,090 B2 | 8/2012 | Frader-Thompson et al. | |
| 8,335,936 B2 | 12/2012 | Jonsson et al. | |
| 8,447,541 B2 | 5/2013 | Rada et al. | |
| 8,633,612 B2 | 1/2014 | Bodnar | |
| 8,849,097 B2 | 9/2014 | Klappert | |
| 9,047,071 B2 | 6/2015 | Galsim et al. | |
| 2002/0044459 A1 | 4/2002 | Tsubota et al. | |
| 2002/0044469 A1 | 4/2002 | Yasumura | |
| 2002/0126518 A1 | 9/2002 | Lazarovich | |
| 2002/0185916 A1 | 12/2002 | Barton et al. | |
| 2002/0191425 A1 | 12/2002 | Geissler | |
| 2003/0031037 A1 | 2/2003 | Piaskowski | |
| 2003/0048006 A1 | 3/2003 | Shelter et al. | |
| 2003/0142513 A1 | 7/2003 | Vinciarelli | |
| 2003/0214825 A1 | 11/2003 | Lee | |
| 2004/0240239 A1 | 12/2004 | Ying et al. | |
| 2005/0024803 A1 | 2/2005 | Ying et al. | |
| 2005/0162019 A1 | 7/2005 | Masciarelli et al. | |
| 2007/0038334 A1 | 2/2007 | Chou et al. | |
| 2007/0064363 A1 | 3/2007 | Nielsen et al. | |
| 2007/0164613 A1 | 7/2007 | Yamada et al. | |
| 2007/0195566 A1 | 8/2007 | Nielsen et al. | |
| 2007/0228837 A1 | 10/2007 | Nielsen et al. | |
| 2008/0042491 A1 | 2/2008 | Klikic et al. | |
| 2008/0067872 A1 | 3/2008 | Moth | |
| 2008/0157601 A1 | 7/2008 | Masciarelli et al. | |
| 2008/0165461 A1 | 7/2008 | Paik et al. | |
| 2008/0247109 A1 | 10/2008 | Chen et al. | |
| 2009/0160254 A1 | 6/2009 | Wu et al. | |
| 2009/0307505 A1 | 12/2009 | Robertson et al. | |
| 2010/0283326 A1 * | 11/2010 | Kimball | H02J 1/102 307/82 |
| 2011/0057639 A1 | 3/2011 | Chung et al. | |
| 2011/0254371 A1 | 10/2011 | Galsim et al. | |
| 2011/0266870 A1 | 11/2011 | Hu | |
| 2012/0201062 A1 | 8/2012 | Lee | |

FOREIGN PATENT DOCUMENTS

| | | |
|---|---|---|
| CN | 200987067 Y | 12/2007 |
| CN | 101243375 A | 8/2008 |
| CN | 101281394 A | 10/2008 |
| CN | 101582550 A | 11/2009 |
| CN | 201562840 U | 8/2010 |
| CN | 102265470 A | 11/2011 |
| CN | 102354971 A | 2/2012 |
| CN | 102356363 A | 2/2012 |
| DE | 10 2006 053280 A1 | 5/2008 |
| EP | 1494110 A2 | 1/2005 |
| EP | 2 184 816 A1 | 5/2010 |
| GB | 2218274 A | 11/1989 |
| KR | 10-009-0103656 | 8/2010 |
| TW | M246862 U | 10/2004 |
| TW | M339719 U | 9/2008 |
| TW | 201009563 A | 3/2010 |
| WO | 2006136812 A1 | 12/2006 |

OTHER PUBLICATIONS

Liu et al.: "A novel energy recycling clamp circuit", Applied Power Electronics Conference and Exposition, 2005. Twentieth Annual IEEE, Austin, TX, USA Mar. 6-10, 2005, Piscataway, NJ USA, IEEE, US, vol. 2, Mar. 6, 2005, pp. 1205-1209 vol. 2, XP010809449, DOI: 10.1109/APEC.2005.1453154, ISBN: 978-0-7803-8975-5.

Liu: "Comparative Study of Snubber Circuits for DC-DC Converters Utilized in High Power Off-Line Power Supply Applications", Applied Power Electronics Conference and Exposition, 1999. APEC '99. Fourteenth Annual Dallas, TX, USA Mar. 14-18, 1999, Piscataway, NJ USA, IEEE, US, vol. 2 Mar. 14, 1999, pp. 821-826, XP010323615, ISBN: 978-0-7803-5160-8.

* cited by examiner

METHOD AND APPARATUS FOR CONTROLLING DISTRIBUTION OF POWER

This application is a U.S. National Stage Application under 35 U.S.C. § 371 of International Application No. PCT/CN2012/080905, filed Sep. 3, 2012, which is hereby incorporated herein by reference in its entirety.

BACKGROUND OF INVENTION

1. Field of Invention

Embodiments of the present disclosure relate generally to methods and systems for analyzing and managing distribution of power to multiple devices from a common power source.

2. Discussion of Related Art

Some home and office equipment manufacturers have implemented standby power saving technology in their products. In accordance with this technology, home and office equipment that consumes electrical power may automatically transfer to a standby power saving mode when not used for a period of time, thus reducing overall power consumption. Some television sets and personal computers utilize this standby power saving mode, but many peripherals such as computer monitors, DVD players, audio amplifiers, printers, scanners, and handheld device battery chargers are not typically configured to enter a standby or sleep mode upon periods of non-use, and thus, may consume considerable amounts of energy even when not in use.

Several solutions to disable power to peripherals under certain conditions exist currently in the market. Such examples include power strips having surge protectors that offer "master" and "controlled" outlets. The CPU of a computer, a television, or a receiver of an audio/video (A/V) system is plugged into the "master" or "primary" outlet. The system peripherals are connected to the "controlled" or "secondary" outlets. When the device plugged into the "master" outlet goes into standby power mode, as determined by the current drawn by the "master" device falling below a factory pre-set current set point, or in some cases an adjustable setpoint, the "controlled" outlets are turned off, thereby reducing energy consumption by cutting power to these peripherals which otherwise may continue to use power even though not in use.

SUMMARY OF THE INVENTION

One aspect of the invention is directed to an apparatus for controlling application of power to a plurality of devices including a master device and at least one controlled device. The apparatus includes a power inlet constructed and arranged to receive power from a power source, a plurality of power outlets including a master power outlet and at least one controlled power outlet, a control circuit configured to sense a characteristic of power delivered to the master power outlet and having an output configured to provide an output control signal, a relay circuit coupled to the control circuit, the power inlet and to the at least one controlled power outlet, and a power supply configured to provide power to the control circuit and to the relay circuit, the power supply having an input coupled to the output of the control circuit to receive the output control signal, the power supply being further configured to adjust a voltage level of a first output voltage generated by the power supply based on a state of the output control signal.

In the apparatus, the control circuit may be further configured to detect a reduction in the characteristic of power delivered to the master power outlet, and in response, provide the output control signal having a first state, and the power supply may be further configured to reduce the voltage level of the first output voltage in response to receiving the output control signal having the first state. The control circuit may be further configured to detect an increase in the characteristic of power delivered to the master power outlet, and in response, provide the output control signal having a second state, and the power supply may still be further configured to increase the voltage level of the first output voltage in response to receiving the output control signal having the second state. The power supply may be configured such that the voltage level of the first output voltage is 8 volts with the output control signal in the first state and the voltage level of the first output voltage is 24 volts with the output control signal in the second state. The power supply may be further configured to generate a second output voltage using the first output voltage. The power supply may include a buck converter configured to generate the first output voltage. The power supply may include a linear regulator having an input to receive the first output voltage and an output that provides the second output voltage. The control circuit may be further configured to provide a control signal to the relay circuit to control a state of the relay circuit and to enable and disable power to the at least one controlled outlet. In the apparatus, the characteristic of power delivered to the master power outlet sensed by the control circuit may be current.

Another aspect is directed to a method of controlling power distribution to a plurality of devices including a master device and at least one controlled device, the master device having at least a first mode of operation and a second mode of operation, with the second mode of operation being a lower power mode of operation than the first mode of operation. The method includes providing power to the master device through a primary outlet of a power distribution unit, measuring an operating characteristic of power provided through the primary outlet, detecting a change in operation of the master device from the first mode of operation to the second mode of operation, and in response, turning off power to the at least one controlled device and reducing an output voltage of a power supply in the power distribution unit.

The method may include detecting a change in operation of the master device from the second mode of operation to the first mode of operation, and in response, turning on power to the at least one control device and increasing an output voltage of the power supply in the distribution unit. The method may further include generating the output voltage using a buck converter. The method may further include generating an additional output voltage from the output voltage using a linear regulator. In the method, reducing the output voltage may include reducing the output voltage from 24 volts to 8 volts, and measuring an operating characteristic may include measuring current through the primary outlet. The method may further include operating the power distribution unit with the master device in the second mode of operation such that total power draw of the power distribution unit is less than 0.4 watts.

Another aspect is directed to an apparatus for controlling application of power to a plurality of devices including a master device and at least one controlled device. The apparatus includes a power inlet constructed and arranged to receive power from a power source, a plurality of power outlets including a master power outlet and at least one controlled power outlet, a power supply coupled to the power inlet and configured to provide a first output voltage having a voltage value, and means for detecting a first change in a mode of operation of the master device, and in response turning off power to the at least one controlled device and reducing the voltage value of the first output voltage from a first level to a second level.

The apparatus may further include means for detecting a second change in a mode of operation of the master device, and in response, turning on power to the at least one controlled device and increasing the voltage value of the first output voltage. The apparatus may also include means for generating a second output voltage using the first output voltage. In the apparatus, the first level may be 24 volts and the second level may be 8 volts.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

One challenge faced by developers of smart power strips and other power distribution devices is the ever increasing desire to limit power draw of the devices, particularly in standby mode. Energy regulating and certification bodies are setting more difficult standards for power distribution devices operating in standby mode. One such Chinese standard CQC3121-2009, titled Energy Conservation Certification Criteria for Socket-outlets and Adapters requires that smart strips of the type described above draw less than 0.4 watts in standby mode.

Typically, existing smart power strips are required to generate two DC voltages for use by internal components. A relatively low, logic level, DC voltage is needed by a CPU contained within the smart strip, and a higher voltage, typically 24 volts, is used to control a relay for providing power to the controlled outlets of the smart strip. In prior devices, typically one of three solutions are used to generate the higher voltage needed to control the relay to provide power to the controlled outlets. One solution is to use a simple capacitor dropper circuit. This solution is fairly simple, but in one example, in which a 1 uF capacitor is used, the standby power draw is approximately 1.5 W. In another solution, a buck converter is used to generate 24 volts and a linear regulator is used to generate the logic level voltage from the 24 volts output of the buck converter. In this solution, it is also difficult to provide a standby power draw of less than 0.4 W, primarily because of losses associated with the operation of the linear regulator from the relatively high 24 Volt input. In a third existing solution, a traditional flyback converter is used to generate both voltages. While this solution is able to provide a low standby power draw, it is fairly complex, requiring more components, and is therefore, more expensive.

At least some examples described herein provide smart power strips having low power draw in standby mode of operation, and in at least one example, the power draw is less than 0.4 W in standby mode of operation, and in at least one embodiment, the power draw in standby mode of operation is 0.31 W.

Figure 1:
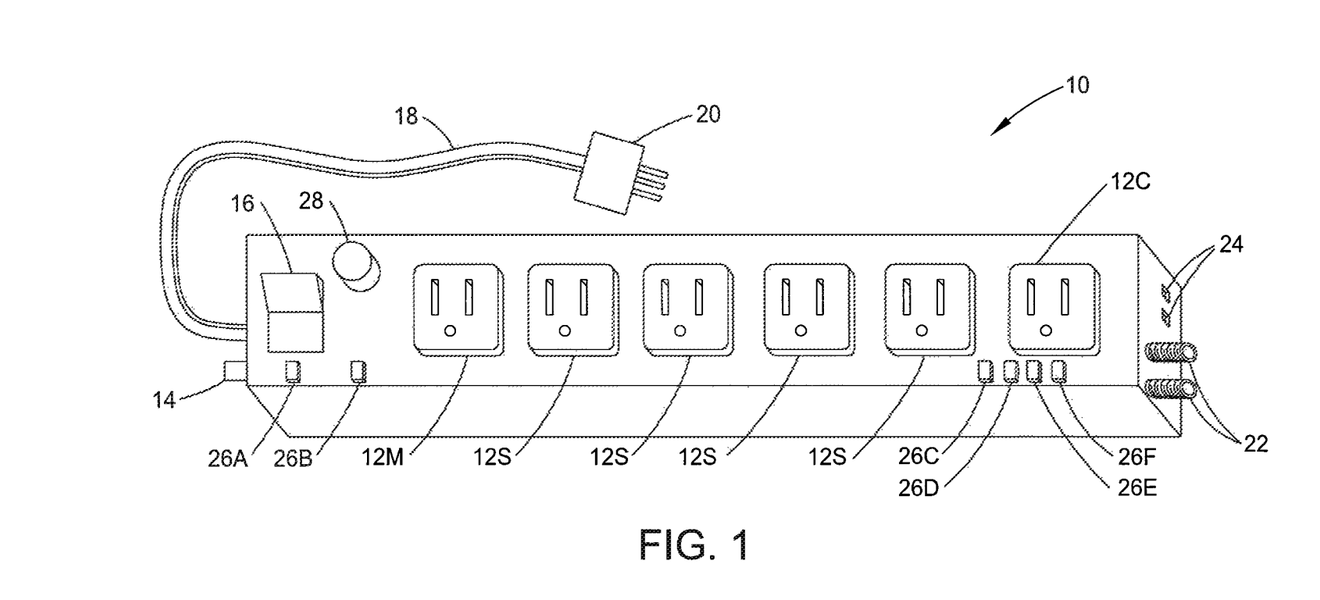
FIG. 1 is a perspective view of a power strip according to an embodiment of the present invention.

Illustrated in FIG. 1 is a power strip 10 in accordance with one embodiment of the present invention. Power strip 10 has one master device outlet 12M, and four controlled device outlets 12S. In other embodiments, the number of controlled outlets may be greater or less than four. Power to controlled device outlets 12S is disrupted in response to a device plugged into the master outlet 12M entering a standby mode or sleep state. Power strip 10 also includes a constant power outlet 12C, which may be utilized for connecting a device to which a user desires power to be delivered regardless of the status of a device plugged into the master outlet 12M.

Power strip 10 includes an internal circuit breaker, EMI filter/surge protector, and ground fault detector (not shown). Power strip 10 includes a power reset switch 14 in addition to a main power switch 16. Power reset switch 14 may be utilized to restore power to the outlets of the power strip if the power is discontinued by, for example, the circuit breaker or ground fault detector. Power strip 10 also includes a power inlet, comprising power cord 18 and plug 20, for plugging into an external source of power to receive power and supply power to the power strip.

Power strip 10 also includes connections for coaxial cables 22 and/or telephone lines 24 to enable signals travelling along a connected coaxial cable and/or telephone line to be routed through the internal EMI filter/surge protector to provide protection to these lines.

Power strip 10 includes indicators 26A-26F which comprise LEDs, although other suitable light emitting devices or indicators may be present in alternate embodiments. Indicators 26A-26F are used to indicate various operating conditions of power strip 10, including the condition that power is being supplied to the power strip, that power is being supplied to the master and/or controlled device outlets, that a fault condition exists, that a standby power level set point of a master outlet has been met or exceeded, and that a standby power test is being performed or has been completed. In alternate embodiments, more or fewer indicators may be present and one or more of these indicators may indicate other operating conditions as will be explained further below. Power strip 10 also includes a standby power tracking enable switch 28, which may be used to set a standby power level for the master outlet. The operation of the standby power tracking enable switch of one embodiment, is described further in U.S. patent application Ser. No. 13/111,173, filed May 19, 2011, titled Method and Apparatus for Controlling Distribution of Power, which is assigned to the assignee of the present application and incorporated by reference herein.

In other embodiments, power strip 10 includes a plurality of master outlets 12M, at least one controlled device outlet 12S, and optionally, one or more constant power outlets 12C. In some embodiments where there is more than one master outlet, for example two master outlets, the controlled device outlet(s) are deactivated in response to a device connected to either of the master outlets entering a standby mode. In other embodiments where there is more than one master outlet, for example two master outlets, the controlled device outlet(s) are deactivated in response to devices connected to each of the master outlets entering standby modes. In some aspects, under the condition that each of two master devices has entered standby mode, and the controlled device outlet or outlets have been deactivated, the controlled device outlet(s) may be reactivated in response to either one or both of the master devices re-entering active versus standby mode. The master power consumption set points for activation and deactivation of the controlled outlets(s) may be the same or may be different for each of the master outlets.

Alternate embodiments of power strip 10 may include additional features or elements, or may lack one or more of the elements described above, such as an internal circuit breaker, EMI filter/surge protector, ground fault detector, constant power outlet(s), and coaxial cable or telephone line connections.

Figure 2:
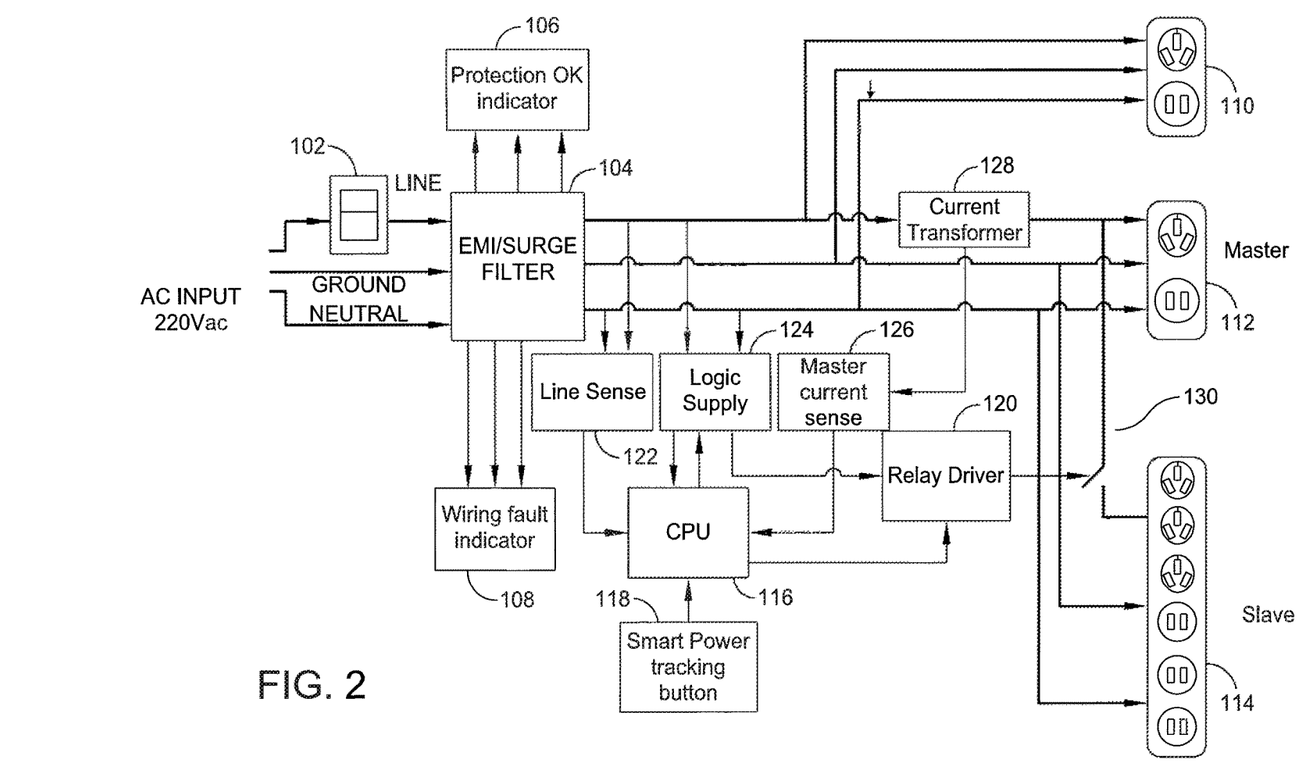
FIG. 2 is a functional block diagram of a smart power distribution device according to an embodiment of the present invention.

FIG. 2 is a functional block diagram of a power distribution device 100 in accordance with one embodiment of the invention. The power distribution device 100 may be configured as a strip, similar to power strip 10 in FIG. 1, or may be packaged in one of a number of other configurations, and may be included as a subsystem in a larger power distribution unit, such as an uninterruptible power supply. The power distribution device 100 is configured to discontinue the power delivered to controlled outlets of the power distribution device when a characteristic of power delivered to a master outlet falls below a first set point defined by the master device standby mode power consumption. The power distribution device 100 is further configured to re-enable power delivery to controlled power outlets when a characteristic of the power delivered to the master outlet rises above a second set point defined by the master device standby mode power consumption. In other embodiments, the power distribution device 100 may measure just the current delivered to a connected master device, and in some embodiments the power distribution device 100 may be configured by a user to measure either the current or the power delivered to a master device, or both.

The power distribution device 100 includes an input switch 102, an EMI/Surge filter 104, indicators 106 and 108, pass through outlets 110, master outlets 112 controlled outlets 114, a CPU 116, a smart power tracking button 118, a relay driver 120, line sense circuitry 122, a logic supply 124, current sense circuitry 126, a current transformer 128, and a relay 130.

Input AC power to the power distribution device 100, passes through the switch 102 and through the EMI/surge filter 104 directly to the pass through outlets 110. The input power is also coupled to the master outlets 112 with the current transformer coupled to detect current to the master outlets. The controlled outlets are coupled to the input power through the relay 130. The EMI/surge filter filters the input power and provides power surge protection for the power distribution device and components coupled to the outlets. Indicator 106 provides an indication of the status of one or more protection devices in the EMI/surge filter 104 and indicator 108 provides an indication upon detection of a wiring fault at the input of the power distribution device 100.

The CPU 116 monitors the input power through the line sense circuitry 122, the master current sense circuitry 126 and the current transformer 128. In one embodiment, the CPU 116 is implemented using a microcontroller having part number PIC16F716, available from Microchip Technology, Inc. of Arizona, USA. In other embodiments the function of the CPU may be implemented with other types of controllers or control circuitry and/or may be implemented using other logic devices. The CPU 116 is coupled to the logic supply 124 to receive a logic level DC voltage from the logic supply. The CPU also provides a disable signal to the logic supply 124 as described in further detail below. The CPU is also coupled to the relay driver 120 to provide a control signal to control the relay 130. The logic supply is also coupled to the relay driver 120 to provide a relay drive voltage that in one embodiment is equal to 24 Vdc. The smart power tracking button 118 is coupled to the CPU 116, and in one embodiment is used to set a standby threshold power level for the master outlets.

In operation, the CPU 116 monitors the power to the master outlets 112, and if the power to the master outlets is above the standby threshold level, then the CPU 116 provides a control signal to the relay driver 120 to close the relay 130 to provide power to the controlled outlets 114. If the CPU detects that the power to the master outlets has dropped below the standby threshold level, then the CPU disables the control signal to the relay driver to open the relay 130 to remove power from the controlled outlets. When the power to the master outlets 112 drops below the standby threshold level, then the CPU 116 also sends a disable signal to the logic supply 124 to reduce the level of one of the outputs of the logic supply. As described below in greater detail, the reduction in the output voltage level of the logic supply allows the power distribution device 100 to operate in an economical manner in standby mode of operation.

Figure 3:
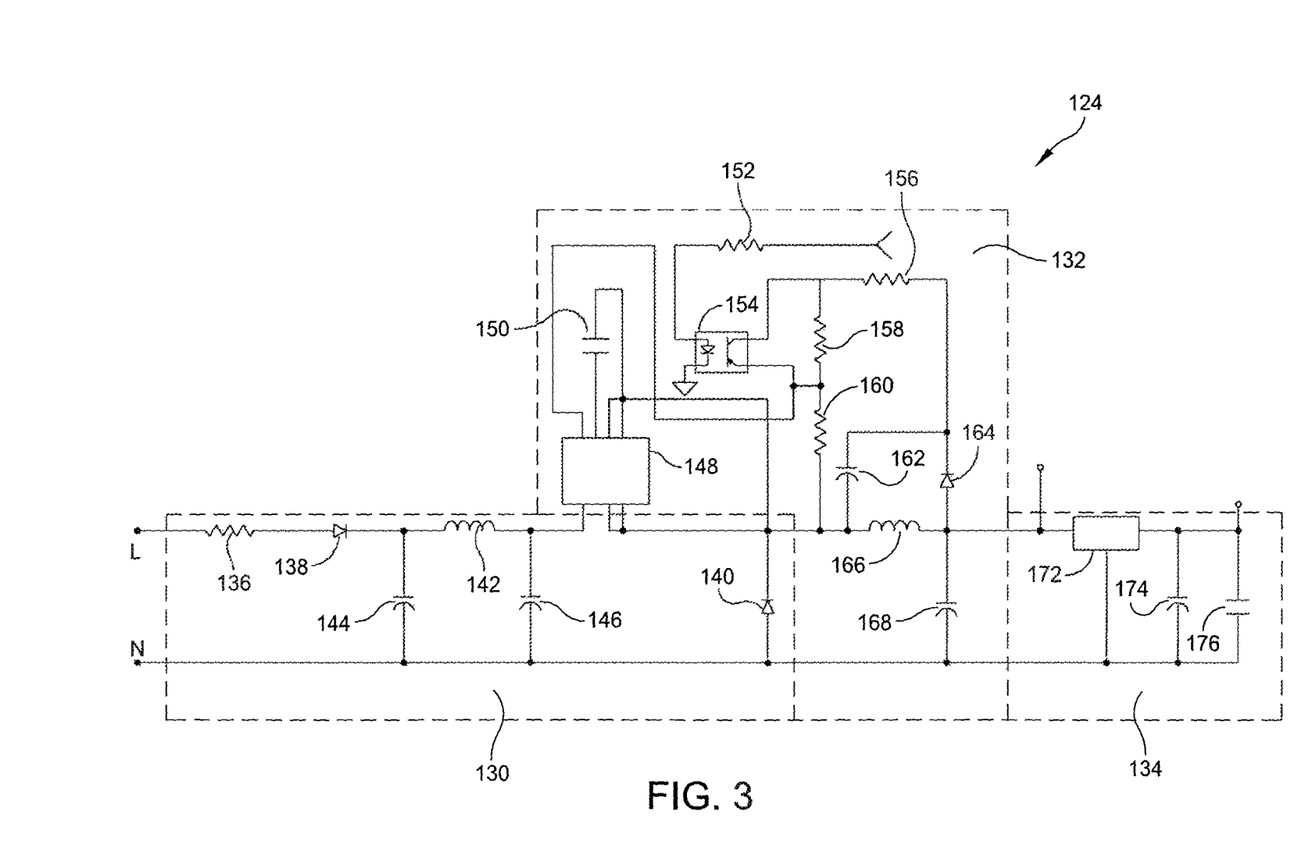
FIG. 3 is a schematic drawing showing a logic supply of the embodiment in FIG. 2 in greater detail.

The logic supply 124 will now be described in greater detail with reference to FIG. 3. As shown in FIG. 3, the logic supply includes three functional blocks, an input block 130, a buck converter 132, and a linear regulator 134. The input block includes a resistor 136, rectifier diodes 138 and 140, capacitors 144 and 146, and an inductor 142. Input AC power is received at line and neutral connections of the input block. In one embodiment, the input power is 220 volts 50 Hz, however, in other embodiments other voltages and line frequencies may be used. The input block provides filtering and rectification of the input power and provides a rectified high voltage to the buck converter 132.

The buck converter 132 includes a switcher IC 148, capacitors 150, 162 and 168, a diode 164, an inductor 166, resistors 152, 158 and 160, and an optical switch 154. The buck converter 132 also includes a 24 volt disable line to receive a disable signal from the CPU when the power distribution device enters standby mode. In one embodiment, the switcher IC 148 is implemented using an integrated circuit having part number LNK302, available from Power Integrations, Inc. of San Jose, Calif. The buck converter receives the rectified voltage from the input block 130 and provides an output voltage of either 24 volts or 8 volts across capacitor 168. When the disable signal is received at the disable input 170, the optical switch is turned on bypassing resistor 158, which changes the feedback voltage of the switcher IC 148 and changes the output voltage from 24 volts to 8 volts.

The linear regulator 134 of the logic supply 124 includes a regulator IC 172 and output capacitors 174 and 176. In one embodiment, the regulator IC 172 is implemented using a regulator having part number LP2950, available from Texas Instruments Inc. of Connecticut, USA. The linear regulator 134 receives either the 8 volt or 24 volt DC output from the buck converter 132 and provides a 5 volt DC output to power the CPU 116.

Figure 4:
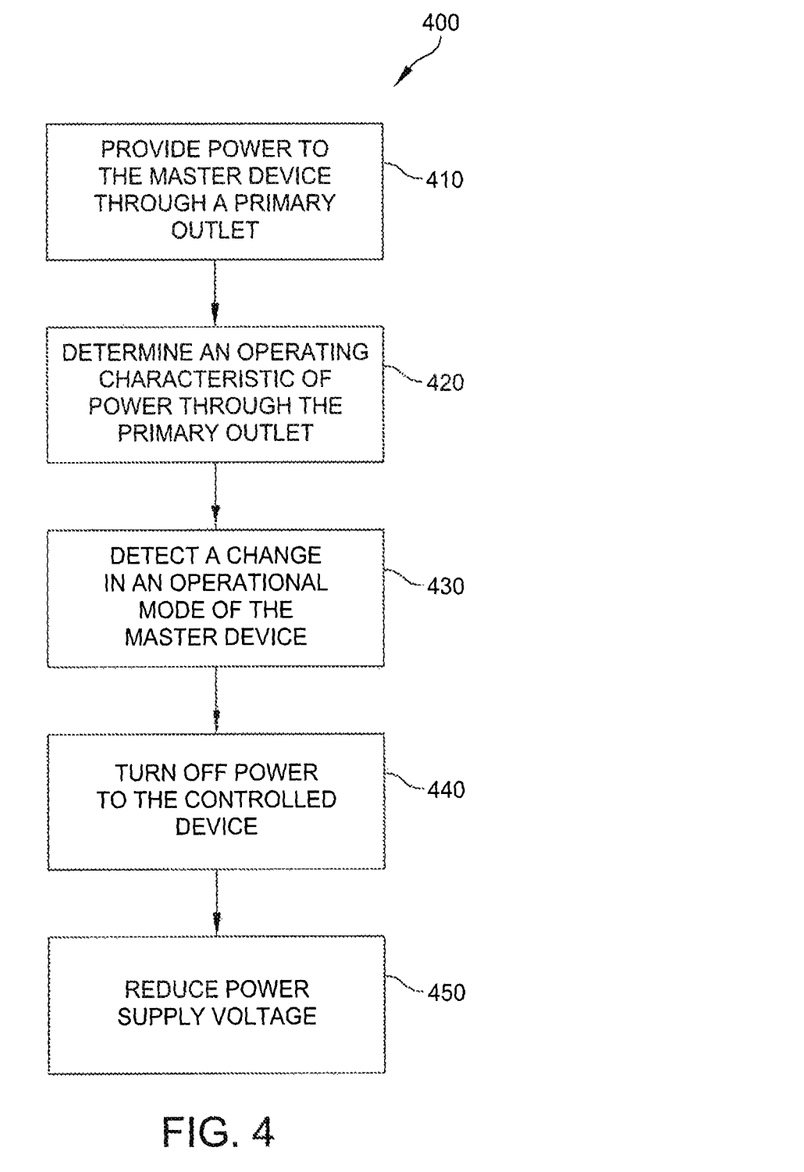
FIG. 4 is a flow chart of a method in accordance with one embodiment of the present invention.

In at least one embodiment, as will now be described with reference to FIG. 4, a method 400 of controlling power distribution to a plurality of devices including a master device and at least one controlled device is provided. The master device has at least a first mode of operation and a second mode of operation, with the second mode of operation being a lower power mode of operation than the first mode of operation. The method includes a first act 410 of providing power to the master device through a primary outlet of a power distribution unit, such as the power distribution unit 10 shown above in FIG. 1. In a second act 420 of the method, an operating characteristic of power provided through the primary outlet is determined. The operating characteristic may be current or power in different embodiments. In a next act 430, a change in the operational mode of the master device is detected. In at least one embodiment, this change is detected based on a change in power or current to the master device. In the method 400, in response to detecting the change, at act 440, power to the at least one controlled device is turned off and at act 450 an output voltage of a power supply in the power distribution unit is reduced. The method 400 allows a power distribution device to operate in a very low power mode when a master device coupled to the power distribution device is in a standby mode of operation.

In at least one embodiment described above, a logic power supply is controlled in the standby mode of a power strip to reduce an output voltage by changing the effective resistance of a feedback circuit within the logic power supply. In other embodiments, other circuits may be used to reduce the voltage generated by the power supply to reduce power draw of power distribution devices in a standby mode of operation.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. An apparatus for controlling application of power to a plurality of devices including a master device and at least one controlled device, the apparatus comprising:
   a power inlet constructed and arranged to receive power from a power source;
   a plurality of power outlets including a master power outlet and at least one controlled power outlet;
   a control circuit configured to sense a characteristic of power delivered to the master power outlet and having an output configured to provide an output control signal;
   a relay circuit coupled to the control circuit, the power inlet and to the at least one controlled power outlet; and
   a power supply configured to provide DC power to the control circuit and to the relay circuit, the power supply having an input coupled to the output of the control circuit to receive the output control signal, the power supply being further configured to adjust a DC voltage level of a first output voltage generated by the power supply based on a state of the output control signal, the power supply being further configured to generate a second output voltage using the first output voltage, the power supply including a buck converter configured to generate the first output voltage, and a linear regulator having an input to receive the first output voltage and an output that provides the second output voltage.

2. The apparatus of claim 1, the control circuit being further configured to detect a reduction in the characteristic of power delivered to the master power outlet, and in response, provide the output control signal having a first state, and the power supply being further configured to reduce the DC voltage level of the first output voltage in response to receiving the output control signal having the first state.

3. The apparatus of claim 2, the control circuit being further configured to detect an increase in the characteristic of power delivered to the master power outlet, and in response provide the output control signal having a second state, and the power supply being further configured to increase the DC voltage level of the first output voltage in response to receiving the output control signal having the second state.

4. The apparatus of claim 3, wherein the power supply is configured such that the DC voltage level of the first output voltage is 8 volts with the output control signal in the first state and the DC voltage level of the first output voltage is 24 volts with the output control signal in the second state.

5. The apparatus of claim 1, wherein the control circuit is configured to provide a control signal to the relay circuit to control a state of the relay circuit and to enable and disable power to the at least one controlled outlet.

6. The apparatus of claim 5, wherein the characteristic of power delivered to the master power outlet sensed by the control circuit is current.

7. A method of controlling power distribution to a plurality of devices including a master device and at least one controlled device, the master device having at least a first mode of operation and a second mode of operation, with the second mode of operation being a lower power mode of operation than the first mode of operation, the method comprising:
   providing power to the master device through a primary outlet of a power distribution unit;
   measuring an operating characteristic of power provided through the primary outlet;
   detecting a change in operation of the master device from the first mode of operation to the second mode of operation, and in response, turning off power to the at least one controlled device and reducing an output DC voltage of a power supply in the power distribution unit;
   detecting a change in operation of the master device from the second mode of operation to the first mode of operation, and in response, turning on power to the at least one control device and increasing the output DC voltage of the power supply in the distribution unit;
   generating the output DC voltage using a buck converter; and
   generating an additional output voltage from the output DC voltage using a linear regulator.

8. The method of claim 7, wherein reducing the output DC voltage includes reducing the output DC voltage from 24 volts to 8 volts.

9. The method of claim 7, wherein measuring an operating characteristic includes measuring current through the primary outlet.

10. The method of claim 7, further comprising operating the power distribution unit with the master device in the second mode of operation such that total power draw of the power distribution unit is less than 0.4 watts.

* * * * *